(12) United States Patent
Weerawarana et al.

(10) Patent No.: US 6,408,299 B1
(45) Date of Patent: Jun. 18, 2002

(54) TYPE CONVERTOR REGISTRY

(75) Inventors: Sanjiva Weerawarana, Yorktown Heights; David A. Epstein, Ossining; Francisco P. Curbera, Bronx, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,431

(22) Filed: Jan. 28, 1999

(51) Int. Cl.[7] .................................................. G06F 7/00
(52) U.S. Cl. .......................... 707/101; 702/10; 707/104
(58) Field of Search .............................. 717/1, 5, 142, 717/100, 143, 144; 707/202, 203, 10, 104, 101; 709/227

(56) References Cited

U.S. PATENT DOCUMENTS

| | | | | |
|---|---|---|---|---|
| 5,524,253 A | * | 6/1996 | Pham et al. | 709/202 |
| 5,640,567 A | * | 6/1997 | Phipps | 717/3 |
| 5,742,806 A | * | 4/1998 | Reiner et al. | 707/3 |
| 5,752,021 A | * | 5/1998 | Nakatsuyama et al. | 707/5 |
| 6,006,031 A | * | 12/1999 | Andrews et al. | 717/1 |
| 6,021,433 A | * | 2/2000 | Payne et al. | 709/219 |
| 6,035,307 A | * | 3/2000 | Martin et al. | 707/203 |
| 6,041,344 A | * | 3/2000 | Bodamer et al. | 709/203 |
| 6,055,370 A | * | 4/2000 | Brown et al. | 717/5 |
| 6,063,128 A | * | 5/2000 | Bentley et al. | 703/6 |
| 6,092,086 A | * | 7/2000 | Martin et al. | 707/202 |
| 6,094,684 A | * | 7/2000 | Pallmann | 709/227 |
| 6,134,559 A | * | 10/2000 | Brumme et al. | 707/103 |
| 6,158,044 A | * | 12/2000 | Tibbetts | 717/1 |
| 6,163,781 A | * | 12/2000 | Wess, Jr. | 707/103 |
| 6,182,153 B1 | * | 1/2001 | Hollberg et al. | 709/315 |
| 6,226,649 B1 | * | 5/2001 | Bodamer et al. | 707/104 |
| 6,236,997 B1 | * | 5/2001 | Bodamer et al. | 707/10 |

OTHER PUBLICATIONS

Title: Module Selection and Data Format conversion for cost–Optimal DSP Synthesis, author: Ito et al, ACM, 1994.*
Title: An Easy–To–Use Tool For Data Transformation, Source: Software, Jun. 1998.*

* cited by examiner

Primary Examiner—Kakali Chaki
Assistant Examiner—Chameli Chaudhuri Das
(74) Attorney, Agent, or Firm—Whitham, Curtis & Christofferson P.C.; Stephen C. Kaufman

(57) ABSTRACT

A generalized mechanism manages ad-hoc type conversions in computer software. A management framework improves type conversion tasks by enabling the modularization of this task by partitioning the work of defining an individual type convertor from the task of identifying and locating type convertors on demand. The details of how type convertors are applied on demand are also a function of the management framework.

6 Claims, 4 Drawing Sheets

REGISTERED CONVERTERS

TYPE LATTICE

TYPE CONVERTOR REGISTRY

BACKGROUND OF THE INVENTION

1. Field of the Invention

The present invention generally relates to the conversion of data from one type to another type in computer software and, more particularly, to a generalized mechanism to manage ad-hoc type conversions in computer software.

2. Background Description

Converting data from one type, e.g., a string, to another type, e.g., a color, is a very common operation in computer software. An extremely common occurrence of this is when accepting an input in a graphical user interface (GUI) via a text field for a non-string data item such as a number.

Several categories of type conversions can be identified:

automatic type converts, where the language processor automatically converts a value of one type to be of another type by applying some conversion logic built-in to the language processor. This may be done for primitive types as well as for object types. In object systems, such conversions are limited to upward type converts in the underlying type lattice.

user-requested type converts, where the user (i.e., the application programmer) directs the compiler to convert a value of one type to be that of another type by applying either a static, user-defined or built-in convertor. This may be done for primitive types as well as object types.

ad-hoc type converts, where unrelated types of objects are converted using ad-hoc mechanisms, e.g., a string to a font. These are currently explicitly managed by the user (i.e., the application programmer versus the "system" (i.e., the language processor) programmer) by writing appropriate functions and invoking them as needed on an ad-hoc basis. In some cases, certain type conversions may be supported by library functions (e.g., converting from a string to an integer value).

As software development evolves towards the composition of off-the-shelf components, ad-hoc type conversions become ubiquitous. The current approach is very much oriented around a single programmer or programming project managing their own type conversion needs. The problem with this strategy is that it does not scale with large projects nor over time, and tends not to encourage the construction of reusable type convertors.

SUMMARY OF THE INVENTION

It is therefore an object of the present invention to provide a generalized mechanism to manage ad-hoc type conversions in computer software.

According to the invention, there is provided a management framework that separates the task of defining individual type converters from the task of locating type converters on demand. This separation is achieved by the introduction of a "type converter registry". Type converters are added to the registry once they are defined in order to make them available for future use. Later on, type converters are retrieved on demand, by searching them in the registry according to a unique identification key.

This invention encourages and facilitates the reuse of component-oriented type conversions. It makes possible to distribute the usage of the management mechanism to either the application or the system (language processor) level. Finally, it enables run-time redefinition of the conversion algorithms (as opposed to statically defined conversions in the C++ language).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
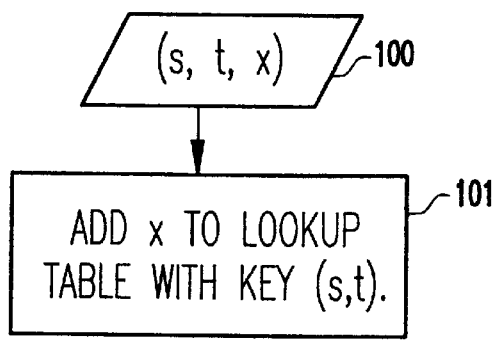
FIG. 1 is a flow diagram representing the logic of the registry add process.
Figure 2:
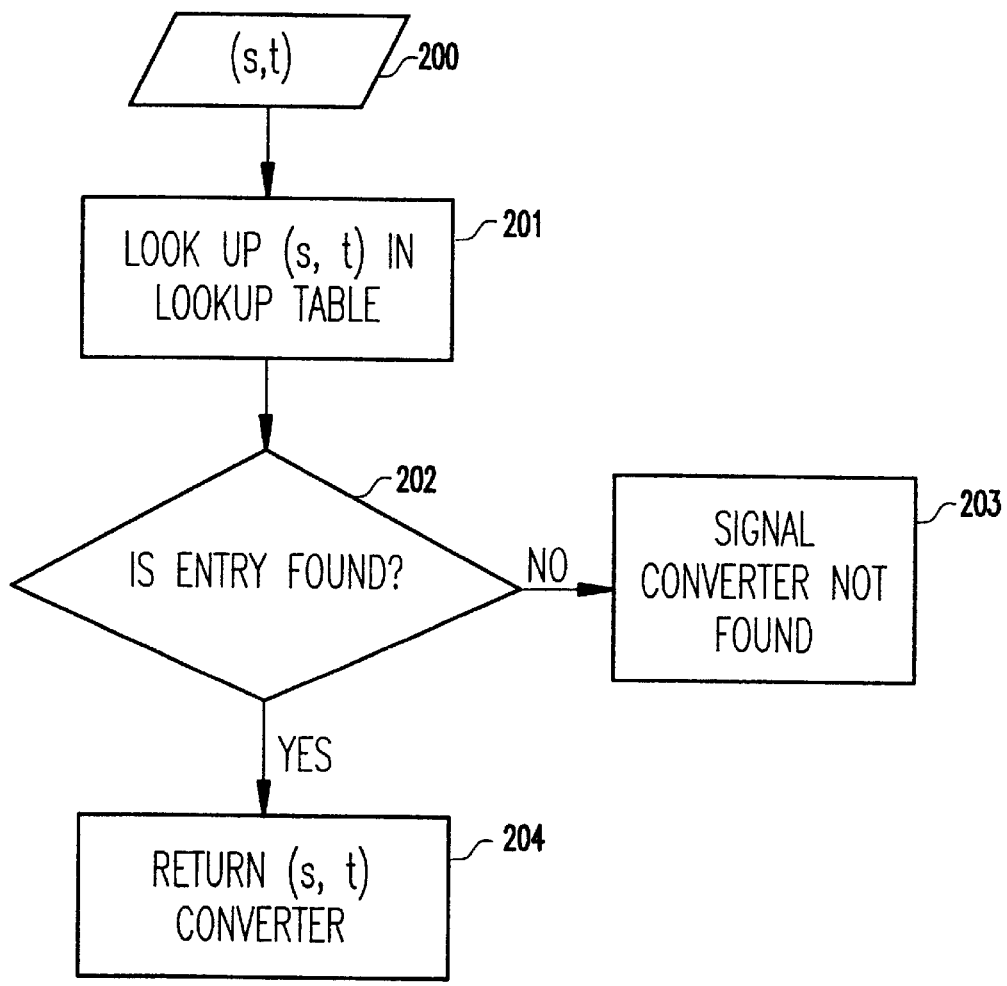
FIG. 2 is a flow diagram representing the logic of the lookup process in a "simple" registry according to the invention.

The registry can be realized to be of different levels of complexity, based on the needs of the environment. The first level, which we term the "simple" level, operates as shown in FIGS. 1 and 2. In FIG. 1, the [triple] tuple 100 including the source type, the destination type and the converter is registered in function block 101, by adding it to a lookup table using the pair (source type, destination type) as the lookup key. A pre-registered converter is retrieved from the simple registry as shown in FIG. 2. A pair of types 200 (source, destination) is provided and used as the key for a table lookup. The lookup table is searched in function block 201. In decision block 202, a test is made to determine whether a converter was found for the requested types. If so, the converter is returned in function block 204; otherwise, in function block 203, a signal is generated to inform the requesting party that no converter is available.

Figure 3A:
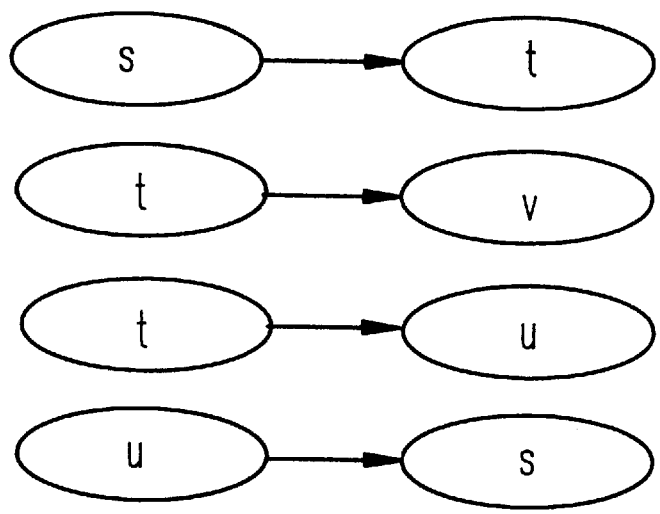
FIGS. 3A and 3B are diagrams representing the logic of the type converter lattice implied by the entries in the registry.
Figure 3B:
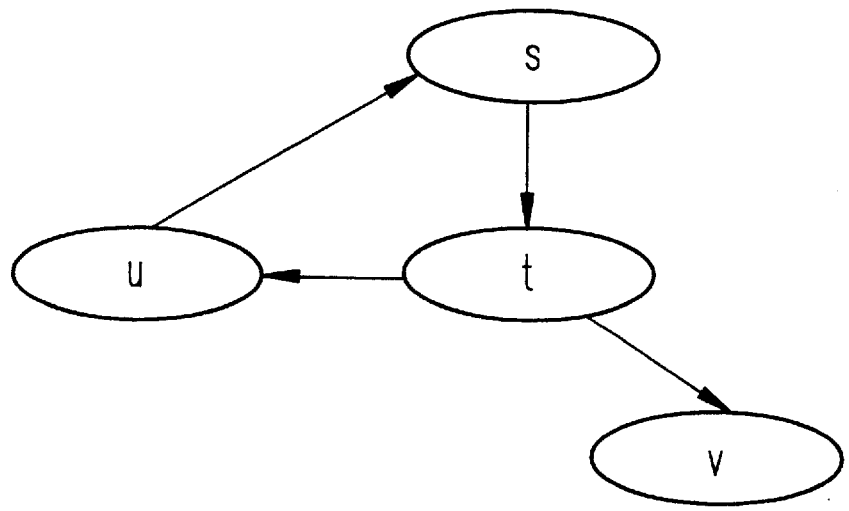

The next level of registry, which we refer to as the "smart" level, adds to the "simple" level by learning information from the type convertors registered into it and derives conversions that are possible by composing existing convertors. This is done by building a type convertor lattice as implied by the registered converters. FIGS. 3A and 3B represent an example type converter lattice, with the registered convertors represented in FIG. 3A, and the implied lattice shown in FIG. 3B. Notice that by successively applying several registered type converters, new conversions become possible. For instance, the conversion from type "t" to type "s" is possible by applying a conversion from "t" to "u" followed by a conversion of type "u" to type "s", even though conversion "t" to "s" is not registered.

Figure 4:
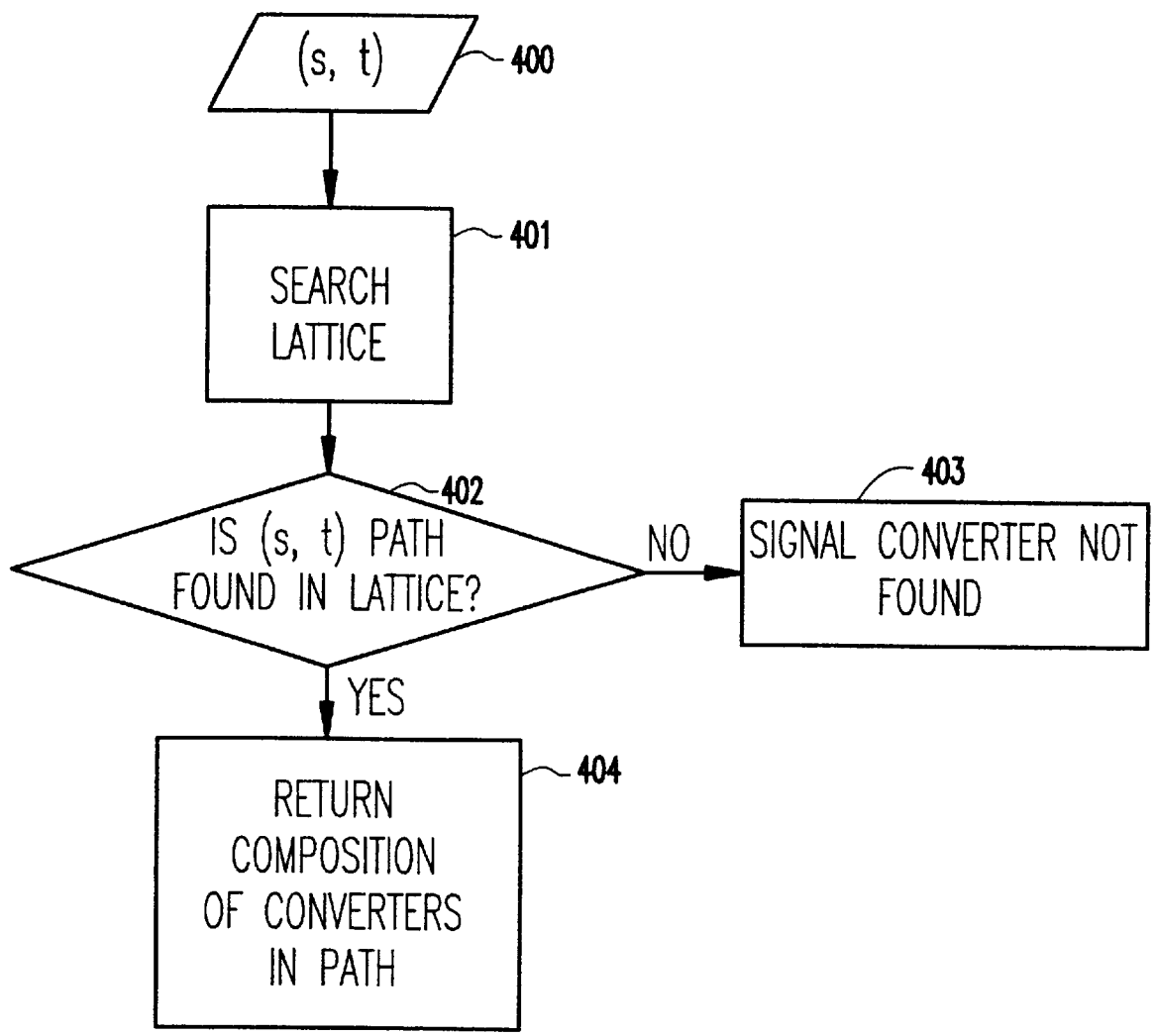
FIG. 4 is a flow diagram representing the logic of the lookup process in a "smart" registry according to the invention.

The lookup operation in the smart registry is shown in FIG. 4. A tuple 400 made up of source and destination types is provided as input. In function block 401, the lattice is searched for a path from the source type to the destination type. In decision block 402, a test checks whether a path was found. If so, in function block 404, the registry returns a composing converter that applies each converter along the path in sequence until the final type is achieved. Otherwise, a return is generated in function block 403 to inform the requester that no converter could be produced. Smart registries may also be aware of the host language's type lattice and use that information to augment its type convertor lattice.

Figure 5:
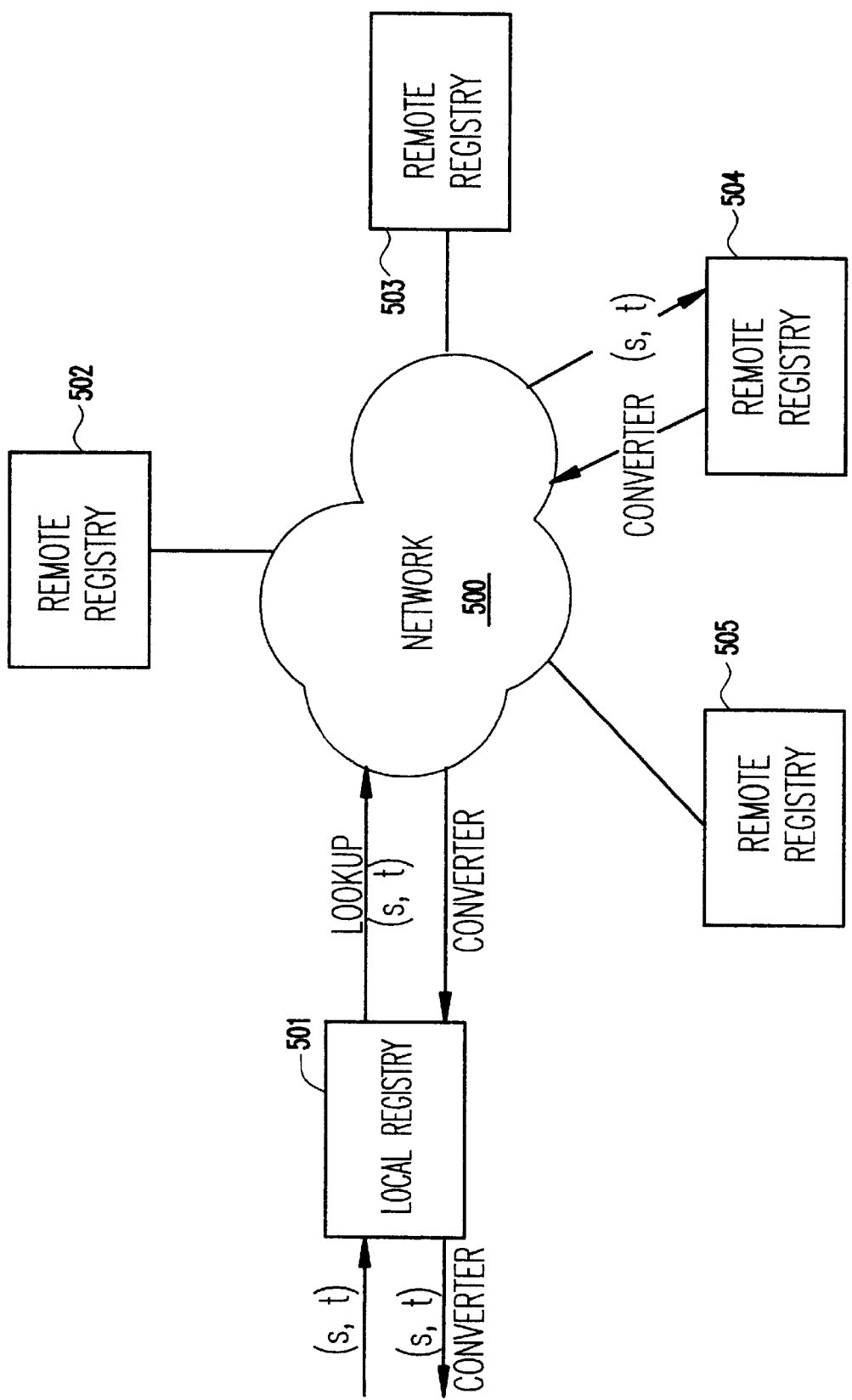
FIG. 5 is a block diagram illustrating an example of a "distributed" or "network aware" registry according to the invention.

The third level of registry is the "distributed" or "network-aware" registry, where either smart or simple registries may use some networked repositories to register and search type convertors. The operation is similar to the simple and smart registries described above. However, now the registry is in fact a "distributed" registry, residing not only on the local computer, but including repositories of type converters residing in other computers in a network. An example of this virtual distributed registry is shown in FIG. 5, where the local registry 501 directs lookup requests to the registries 502 to 505 in the network 500 and receives back the corresponding converters, if found.

The present invention allows the definition of any or all of these types of registries. In the following discussion, we provide a concrete realization of the invention for the Java language.

A type convertor is defined by the following interface:

public interface TypeConvertor {
public Object convert (Class from, Class to, Object obj);
}

The type convertor register is defined by the following interface:

public interface TypeConvertorRegistry {
public void register (Class from, Class to, TypeConvertor convertor);
public TypeConvertor lookup (Class from, Class to) throws BMLException;
}

BML provides a simple implementation of this interface in the following:

public class TypeConvertorRegistryImpl implements TypeConvertorRegistry {
Hashtable reg=new Hashtable ( );
// register a convertor
public void register (Class from, Class to, TypeConvertor convertor ) {
String key=from.tetName ( )+"→"+to.getName ( );
reg.put (key, convertor);
}
// lookup convertor
public TypeConvertor lookup (Class from, Class to) throws BMLException {
String key=from.get Name ( )+"→"+to.getName ( );
return (Typeconvertor) reg.get (key);
}
}

In other registry implementations, the lookup method may traverse a type lattice or search the network or the like.

Specific type convertors are defined as classes that implement the TypeConvertor interface. For example:

// convert from java.lang.String to
//java.awt.Color
Typeconvertor tc=new TypeConvertor ( ) {
public Object convert (Class from, Class to, Object obj) {
return Color.decode ((String) obj);
}
};

Such a convertor would be registered into a type convertor by calling the register method of the registry. For example:

TypeConvertorRegistryImpl tcr=new TypeConvertorRegistryImpl ( );
tcr.register (java.lang.String.class, java.awt.Color.class, tc);

When it is necessary to locate and apply a type convertor, the registry is consulted and the returned type convertor is invoked. For example:

Typeconvertor tc=tcr.lookup (java.lang.String.class, java.awt.Color.class);
color cf=tc.convert (java.lang.String.class, java.awt.Color.class,0xff0000");

While the invention has been described in terms of preferred embodiments, those skilled in the art will recognize that the invention can be practiced with modification within the spirit and scope of the appended claims.

What is claimed is:

1. A computer implemented method of managing type conversion comprising the steps of:

registering in a registry of type conversions a type converter for two given types using a tuple including a source type, a destination type and the type converter;

searching for a registered type converter in the registry of type converters using as a key a source type and a destination type for a desired type conversion;

returning a type converter for the key if a pre-registered type converter is found in the registry; otherwise, searching for a composition of registered type converters from the registry which, when applied, will achieve the type conversion for the key defined by the source type and the destination type and returning a composition of type converters that applies each required type converter in sequence until a final type conversion is achieved.

2. The method recited in claim 1, wherein the registry is composed of distributed registries in a network and the step of retrieving is performed by searching a local registry and one or more remote registries connected to the network.

3. A computer implemented method of managing type conversion comprising the steps of:

registering in a registry of type conversions a type converter for two given types using a tuple including source type, destination type and the type converter;

searching for a registered type converter in the registry of type converters using as a key a source type and a destination type for a desired type conversion;

returning a type converter for a key if a pre-registered type converter is found in the registry; otherwise, searching a type lattice implied by registered type converters using the key defined by the source type and the destination type; and returning a composition of type converters that applies each required type converter in sequence until a final type converter conversion is achieved.

4. The method recited in claim 3, wherein the registry is composed of distributed registries in a network and the step of retrieving is performed by searching a local registry and one or more remote registries connected to the network.

5. A computer system for managing type conversion comprising:

a registry of type conversions storing type converters for two given types using a tuple including source type, destination type and type converter; and a search engine for searching the registry of type conversions for a registered type converter using as a key a source type and a destination type for a desired type conversion, said search engine returning a type converter for a key if a pre-registered type converter is found in the registry; otherwise, said search engine searching a type lattice implied by registered type converters using the key defined by the source type and the destination type and returning a composition of type converters that applies each required type converter in sequence until a final type conversion is achieved.

6. The computer system for managing type conversion recited in claim 5, wherein the registry of type converters is distributed among a local registry and at least one remote registry, further comprising a network connecting the local registry and at least remote registry, said search engine searching the local registry and at least remote registry.

* * * * *